US007362445B2

(12) United States Patent
Law et al.

(10) Patent No.: US 7,362,445 B2
(45) Date of Patent: Apr. 22, 2008

(54) ACTIVE CONTROL AND DETECTION OF TWO NEARLY ORTHOGONAL POLARIZATIONS IN A FIBER FOR HETERODYNE INTERFEROMETRY

(75) Inventors: Joanne Y. Law, Sunnyvale, CA (US); Raymond K. L. Yeung, San Jose, CA (US); Eric S. Johnstone, Redwood City, CA (US); Kerry D. Bagwell, Campbell, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 347 days.

(21) Appl. No.: 11/156,103

(22) Filed: Jun. 17, 2005

(65) Prior Publication Data

US 2006/0285119 A1   Dec. 21, 2006

(51) Int. Cl.
*G01B 9/02* (2006.01)
(52) U.S. Cl. .................................... 356/484; 356/491
(58) Field of Classification Search ................ 356/484, 356/486, 487, 493, 491
See application file for complete search history.

(56) References Cited

U.S. PATENT DOCUMENTS

| | | | | |
|---|---|---|---|---|
| 4,817,206 A | * | 3/1989 | Calvani et al. ............. 398/152 |
| 4,960,319 A | * | 10/1990 | Dankowych .................... 385/1 |
| 5,412,474 A | * | 5/1995 | Reasenberg et al. ........ 356/486 |
| 5,416,628 A | * | 5/1995 | Betti et al. .................... 398/185 |
| 6,961,129 B2 | * | 11/2005 | Law et al. .................... 356/493 |
| 6,961,130 B2 | * | 11/2005 | Law et al. .................... 356/484 |
| 7,009,709 B2 | * | 3/2006 | Law et al. .................... 356/484 |
| 7,076,121 B2 | * | 7/2006 | Law et al. ...................... 385/11 |
| 7,081,959 B2 | * | 7/2006 | Waagaard et al. .......... 356/491 |

* cited by examiner

*Primary Examiner*—Gregory J. Toatley, Jr.
*Assistant Examiner*—Scott M Richey

(57) ABSTRACT

A polarization control system includes a light source that generates two light beams with different polarization states and optical frequencies. A polarization state modulator changes the polarization states of the two light beams. A first detector path generates a first beat signal from the two light beams passing through a first polarizer. A second detector path generates a second beat signal from the two light beams passing through a second polarizer that is oriented substantially orthogonal to the first polarizer. An amplitude detector generates an amplitude beat signal from the first and the second beat signals. The system then uses the amplitude beat signal to determine how to adjust the polarization state modulator in order to generate the first and the second light beams with the desired polarization states.

22 Claims, 12 Drawing Sheets

ACTIVE CONTROL AND DETECTION OF TWO NEARLY ORTHOGONAL POLARIZATIONS IN A FIBER FOR HETERODYNE INTERFEROMETRY

CROSS-REFERENCE TO RELATED APPLICATION

This application is related to U.S. application Ser. No. 10/439,970, filed May 15, 2003, now U.S. Pat. No. 6,961,129, which is incorporated herein by reference.

FIELD OF INVENTION

This invention relates to active control of polarization of a coherent source.

DESCRIPTION OF RELATED ART

Typical applications for a laser interferometer positioning system include integrated circuit (IC) manufacturing equipment (wafer steppers, step and scan tools, and E-beam lithography systems), precision machine tools, and custom stages. The precision and accuracy of positioning measurements are vital to the performance of these systems. When built into these types of equipment, the positioning system measures the position and controls the motion of the platform with high precision and accuracy.

SUMMARY

In one embodiment of the present teachings, a polarization control system includes a light source that generates two light beams with different polarization states and optical frequencies. A polarization state modulator changes the polarization states of the two light beams. A first detector path generates a first beat signal from the two light beams passing through a first polarizer. A second detector path generates a second beat signal from the two light beams passing through a second polarizer that is oriented substantially orthogonal to the first polarizer. An amplitude detector generates an amplitude beat signal from the first and the second beat signals. The system then uses the amplitude beat signal to determine how to adjust the polarization state modulator in order to generate the first and the second light beams with the desired polarization states.

DETAILED DESCRIPTION

Some terms as used within the context of this disclosure are hereafter defined. A retarder (or wave plate) is an optical device that resolves a light wave into two orthogonal polarization components and produces a phase shift (defined as retardance) between them. The resulting light wave is generally of a different polarization form. All angle orientations of retarders in this document refer to orientation of the slow axis relative to the horizontal axis (x-axis). A variable retarder is a retarder whose retardance can be changed by external means, e.g., by the application of a voltage.

A polarization state modulator (PSM) is a device that converts the input polarization state into an output polarization state. The output polarization state is controlled by one or more external inputs applied to the PSM, e.g., voltage. The output polarization state is different from the input polarization state in general. For example, the PSM can consist of multiple variable retarders.

Figure 1:
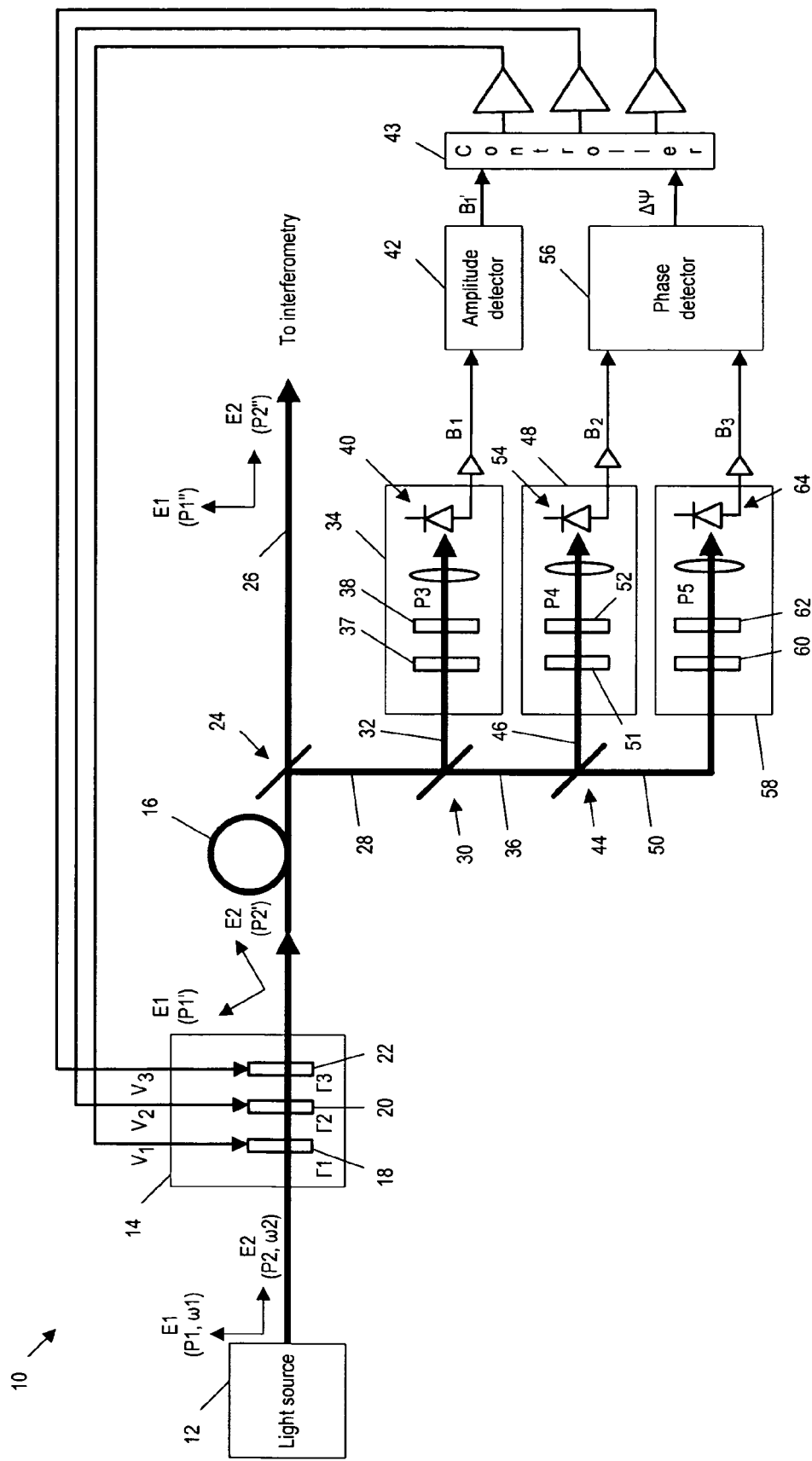
FIG. 1 illustrates a polarization control system for maintaining any polarized states of two orthogonally polarized light beams.

FIG. 1 illustrates a polarization control system 10 disclosed in U.S. application Ser. No. 10/439,970, filed May 15, 2003, now U.S. Pat. No. 6,961,129. System 10 is implemented in a remote operation configuration where the polarization state modulator is located upstream from a single fiber that feeds an interferometry system for measuring displacement.

A light source 12 generates (1) a reference beam E1 with a polarization state P1 and a frequency $\omega1$, and (2) a test beam E2 with a polarization state P2 and a frequency $\omega2$. In one implementation, light source 12 includes a Helium Neon (HeNe) laser and electro-optical components required to generate the desired polarizations and frequencies. For example, light source 12 is a 5517D laser made by Agilent Technologies. A voltage-controlled polarization state modulator (PSM) 14 receives beams E1 and E2 and adjusts their polarization states to P1' and P2', respectively, before launching them into a fiber 16. Voltage-controlled PSM 14 is operable to change any input polarization state to any desired output polarization state. In one implementation, voltage-controlled PSM 14 includes a voltage-controlled variable retarder 18 oriented at 0°, a voltage-controlled variable retarder 20 oriented at 45°, and a voltage-controlled variable retarder 22 oriented at 0°. Retarders 18, 20, and 22 are controlled by voltages V1, V2, and V3 to generate retardances Γ1, Γ2, and Γ3, respectively.

Fiber 16 carries beams E1 and E2 downstream to a measurement site. In one embodiment, fiber 16 is a polarization-maintaining (PM) fiber. Experiments show that fiber 16 changes the polarization states of beams E1 and E2 to P1" and P2", respectively, due to temperature variation, mechanical deformation of the fiber, and mechanical vibration. Nonetheless, fiber 16 produces a negligible change to the orthogonal relationship between the polarization states of beams E1 and E2.

At the measurement site, a beam splitter 24 divides beams E1 and E2 into two paths. An output path 26 carries beams E1 and E2 to the distance-measuring interferometry (hereafter "DMI") system. A monitor path 28 carries beams E1 and E2 to components that monitor and maintain the polarization states of beams E1 and E2 described hereafter. Some or all of these components can be located either at the measurement site or away from the measurement site. For example, light exiting components 38, 52, and 62 can be each coupled to a multimode fiber in conjunction with a focusing lens leading to the detector components away from the measurement site.

A beam splitter 30 receives beams E1 and E2 from path 28 and divides them into two paths. A path 32 carries beams E1 and E2 to a first detector path 34 (also known as a "first polarizer stage"), and a path 36 carries beams E1 and E2 to other detector paths. First detector path 34 includes a polarizer 38 that allows the components of beams E1 and E2 at a selected polarization state P3 to reach a light detector 40. A focusing lens may be interposed between polarizer 38 and light detector 40 to focus the light. In response to the light intensity received, light detector 40 transmits a beat signal B1 at a beat tone frequency of ($\omega1$-$\omega2$) to an amplitude-sensing device 42. Beat signal B1 represent the optical power detected. An amplifier may be interposed between light detector 40 and amplitude-sensing device 42 to amplify the beat signal B1. Before polarizer 38, first detector path 34 can optionally include one or more wave plates 37. Wave plates 37 and polarizer 38 are selected according to the desired orientation of the output polarization states of beams E1 and E2. Specifically, waveplate 37 and polarizer 38 are selected to maximize the sensitivity of the amplitude of beat signal B1 relative to change in the polarization states (e.g., to provide a large slope for the amplitude of beat signal B1 with respect to changes in retardances $\Gamma1$, $\Gamma2$, and $\Gamma3$ of PSM 14).

A beam splitter 44 receives beams E1 and E2 from path 36 and divides them into two paths. A path 46 carries beams E1 and E2 to a second detector path 48 (also known as a "second polarizer stage"), and a path 50 carries beams E1 and E2 to another detector path. Second detector path 48 includes a polarizer 52 that allows the components of beams E1 and E2 at a selected polarization state P4 to reach a light detector 54. A focusing lens may be interposed between polarizer 52 and light detector 54. In response to the light intensity received, light detector 54 transmits a beat signal B2 to a phase detector 56. An amplifier may be interposed between light detector 54 and phase detector 56. Before polarizer 52, second detector path 48 optionally includes one or more wave plates 51. Wave plates 51 and polarizer 52 are selected to generate a large beat signal B2 depending on the desired orientation of the output polarizations states of beams E1 and E2.

Path 50 carries beams E1 and E2 to a third detector path 58 (also known as a "third polarizer stage"). Third detector path 58 includes a polarizer 62 that allows the components of beams E1 and E2 at a selected polarization state P5 to reach a light detector 64. A focusing lens may be interposed between polarizer 62 and light detector 64. In response to the light intensity received, light detector 64 transmits a beat signal B3 to phase detector 56. An amplifier may be interposed between light detector 64 and phase detector 56. Before polarizer 62, the third detector path 58 optionally includes one or more wave plates 60. Wave plates 60 and polarizer 62 are selected to generate a beat signal B3 that has a different phase relationship with beat signal B2 for each of the two possible solutions of beams E1 and E2 corresponding to a minimum amplitude detected by amplitude-sensing device 42 in first detector path 34. In one embodiment, the phase relationship is 90° out of phase (i.e., beat signals B2 and B3 are in quadrature).

Phase detector 56 determines a phase difference $\Delta\Psi$ between beat signals B2 and B3. Amplitude-sensing device 42 determines an amplitude B1' of beat signal B1 at the beat tone frequency (i.e., $\omega1$-$\omega2$). A controller 43 uses beat tone amplitude B1' and phase difference $\Delta\Psi$ to generate control voltages that are applied to PSM 14 in order to achieve the desired polarization states of beams E1 and E2 as they exit fiber 16. Amplifiers may be interposed between controller 43 and PSM 14 to amplify the control signals. Controller 43 can be implemented using analog or digital components.

Specifically, controller 43 adjusts PSM 14 until beat tone amplitude B1' reaches one of two local minimums. If all the orthogonal polarization states of beams E1 and E2 were applied to the system, it would be found that beat tone amplitude B1' has two local minimums because the beat tone function has two degenerate solutions that correspond to two possible orientations of beams E1 and E2. Controller 43 uses phase difference $\Delta\Psi$ to uniquely determine the polarization states of beams E1 and E2 because the phase difference $\Delta\Psi$ has different values at the two local minimums that correspond to the two orientations of beams E1 and E2. The exact correspondence between the values of phase difference $\Delta\Psi$ and the orientations of beams E1 and E2 can be derived conventionally using Jones calculus.

In system 10, the key feedback signal is beat tone amplitude $B_1'$ generated through mixing the two polarization states of beams E1 and E2 through a combination of retarders and polarizers in detector path 40. System 10 actively alters polarization states of beams E1 and E2 upstream such that beat tone amplitude $B_1'$ detected downstream is always minimized.

In the case where the two polarizations are perfectly orthogonal to each other, monitoring of one amplitude beat signal is sufficient for ensuring that the polarizations of both beams E1 and E2 are correctly aligned in the interferometric system. However, in reality, beams E1 and E2 are seldom perfectly orthogonal. By locking beat tone amplitude $B_1'$ to a local minimum, the polarization state of one beam (e.g., E1) is made orthogonal to the polarization state detected in detector path 40 and is thus fixed and stabilized. However, no attempt is made to detect or optimize the polarization state of the other beam (e.g., E2). While it may be unclear as how one can achieve independent control of two polarization states of beams E1 and E2 traveling along the same optical path, one can obtain good overall polarization alignment of the two polarization states by balancing (i.e., trading off) between the two states such that neither of the two polarization states are too far off from the desired orthogonal polarization states. This is often more desirable than having one polarization state perfectly aligned and leaving the other one completely unmonitored.

Figure 2:
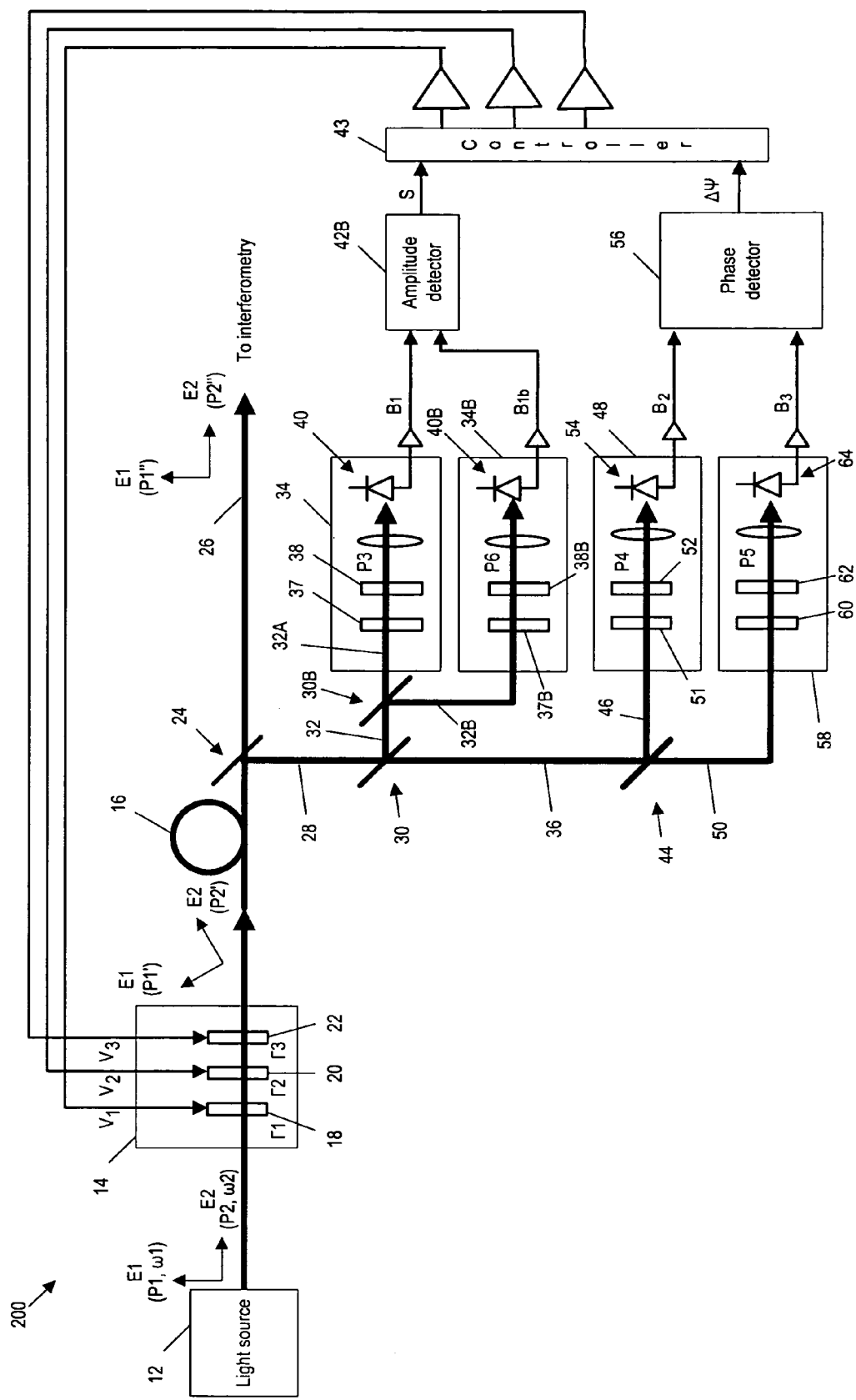
FIG. 2 illustrates a polarization control system for maintaining any polarized states of two nearly orthogonally polarized light beams in one embodiment of the present teachings.

FIG. 2 illustrates a polarization control system 200 that monitors both polarization states in one embodiment of the present teachings. System 200 is similar to system 10 except that a fourth detector path 34B has been added.

A beam splitter 30B is inserted in path 32 and divides light beams E1 and E2 into two paths. A path 32A carries light beams E1 and E2 to detector path 34 as described above. A path 32B carries light beams E1 and E2 to fourth detector path 34B. Fourth detector path 34B includes a polarizer 38B that allows the components of beams E1 and E2 at a selected polarization state P6 to reach a light detector 40B. In one embodiment, polarizer 38B is oriented substantially orthogonal to polarizer 38 in order to detect a second polarization state. A focusing lens may be interposed between polarizer 38B and light detector 40B to focus the light. In response to the light intensity received, light detector 40B transmits a beat signal B1b at a beat tone frequency of ($\omega$1-$\omega$2) to an amplitude-sensing device 42B. Beat signal B1b represent the optical power detected. An amplifier may be interposed between light detector 40B and amplitude-sensing device 42B to amplify the beat signal B1b. Before polarizer 38B, fourth detector path 34B can optionally include one or more wave plates 37B. Wave plates 37B and polarizer 38B are selected according to the desired orientation of the output polarization states of beams E1 and E2.

Amplitude-sensing device 42B generates an amplitude signal S in response to beat signals B1 and B1b. In general, amplitude signal S can be chosen to be any function of amplitudes B1' and B1b' of beat signals B1 and B1b, respectively. In one embodiment, amplitude signal S is a weighted mean-squared signal defined as follows:

$$S = K1*B1'^2 + K2*B1b'^2,$$

where K1 and K2 are constants. K1 and K2 are selected empirically such that the minimum value of signal S results in good alignment of both polarization states.

Figure 3:
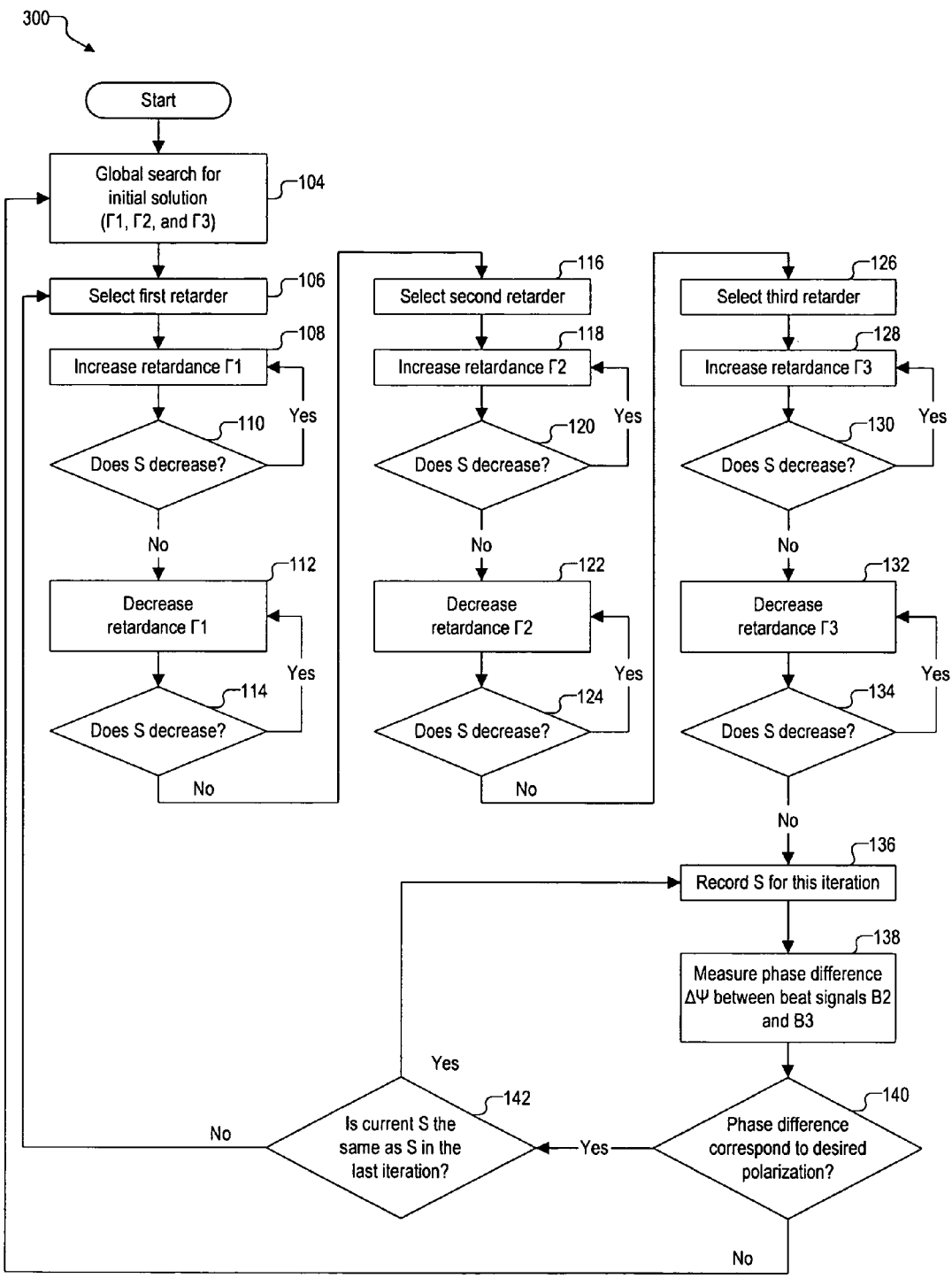
FIGS. 3 and 4 are flowcharts of methods for operating the polarization control system of FIG. 2 in one embodiment of the present teachings.

FIG. 3 illustrates a method 300 for using system 200 to lock into a desired polarization orientation in one embodiment. In a step 104, controller 43 performs a global search for an initial solution of retardances $\Gamma$1, $\Gamma$2, and $\Gamma$3 that would produce a local minimum value of S with the correct polarization orientation. The values of $\Gamma$1, $\Gamma$2, and $\Gamma$3 in the initial solution are used as the initial retardance values. One embodiment of step 104 is described later in reference to FIG. 4.

In steps 106 to 114, controller 43 adjusts retardance $\Gamma$1 of retarder 18 to find the minimum value of signal S that can be achieved with retardance $\Gamma$1. Specifically, in step 106, controller 43 selects retarder 18. In step 108, controller 43 increments retardance $\Gamma$1 by adjusting voltage V1. In step 110, controller 43 determines if signal S has decreased. If so, step 110 is followed by step 108. Otherwise step 110 is followed by step 112.

In step 112, controller 43 decrements retardance $\Gamma$1 by adjusting voltage V1. In step 114, controller 43 determines if signal S has decreased. If so, step 114 is followed by step 112. Otherwise step 114 is followed by step 116.

In steps 116 to 124, controller 43 adjusts retardance $\Gamma$2 of retarder 20 to find the minimum value of signal S that can be achieved with retardance $\Gamma$2. Step 124 is followed by step 126 once the minimum value of signal S has been achieved. In steps 126 to 134, controller 43 adjusts retardance $\Gamma$3 of retarder 22 to find the minimum value of signal S that can be achieved with retardance $\Gamma$3. Step 134 is followed by step 136 once the minimum value of signal S has been achieved.

In step 136, controller 43 records the value of signal S for the current iteration. In step 138, controller 43 determines phase difference $\Delta\Psi$ between beat signals B2 and B3. In step 140, controller 43 determines if the value of phase difference $\Delta\Psi$ corresponds to the desired output polarization states of E1 and E2. Phase difference $\Delta\Psi$ may not correspond to the desired output polarization states if there is a large and sudden change in the condition of fiber 16 that cause a large and sudden change in the polarization states of E1 and E2, which may cause the control loop to lose lock momentarily, and hence the system may not be locked to the same initial solution thereafter. If so, then step 140 is followed by step 104 where method 300 is repeated to search for another initial solution of retardances $\Gamma$1, $\Gamma$2, and $\Gamma$3. If phase difference $\Delta\Psi$ corresponds to the desired output polarization states of E1 and E2, then step 140 is followed by step 142.

In step 142, controller 43 determines if the current value of signal S is the same as the recorded value of signal S from the previous iteration. If so, then step 142 is followed by 136 and method 300 loops until signal S changes value. If the current value of signal S is not the same as the recorded value of signal S from the previous iteration, then step 142 is followed by step 106 and method 300 is repeated to search for another local minimum of signal S.

Figure 4:
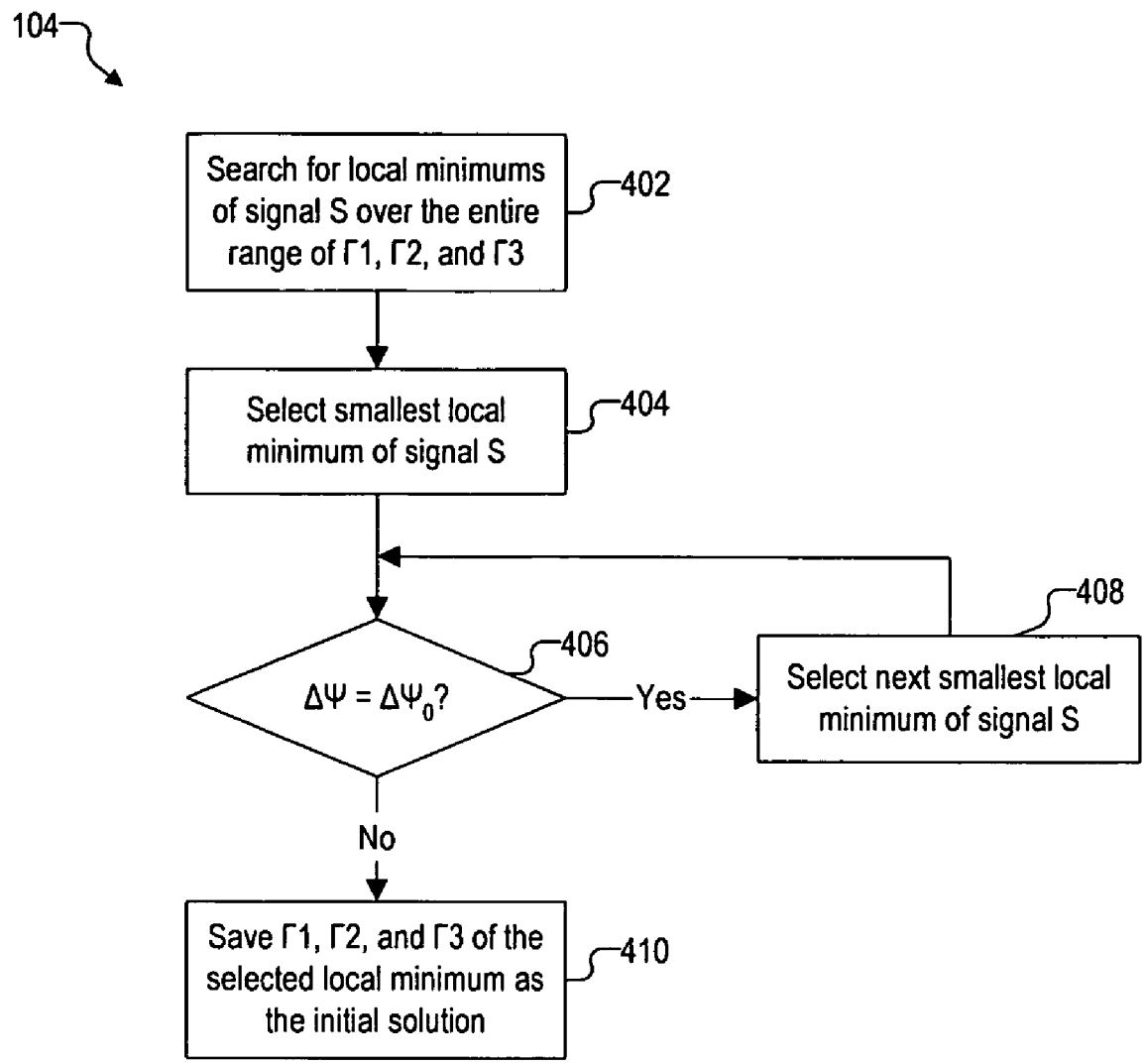

FIG. 4 illustrates one embodiment of step 104 where controller 43 searches through some or all of the polarization states of E1 and E2 for an initial solution of retardances $\Gamma$1, $\Gamma$2, and $\Gamma$3 that produces the desired orientation of the polarization states of E1 and E2.

In step 402, controller 43 searches for local minimums of signal S over the entire range of retardances $\Gamma$1, $\Gamma$2, and $\Gamma$3. In step 404, controller 43 selects the smallest of the local minimums of signal S. In step 406, controller 43 determines if the selected local minimum of signal S has a corresponding a phase difference $\Delta\Psi$ that is substantially equal to a desired phase difference $\Delta\Psi_0$. As described earlier, a local minimum value of S along with $\Delta\Psi=\Delta\Psi_o$ correspond to the desired output polarization states of E1 and E2. If phase difference $\Delta\Psi$ is substantially equal to a desired phase difference $\Delta\Psi_o$, then step 406 is followed by step 410. Otherwise step 406 is followed by step 408. In step 408, controller 43 selects the next smallest local minimum of signal S. Step 408 is followed by step 406 and the process repeats until controller 43 finds a local minimum of signal S that has a phase difference $\Delta\Psi$ substantially equal to a desired phase difference $\Delta\Psi_o$. In step 410, controller 43 saves the values of retardances $\Gamma$1, $\Gamma$2, and $\Gamma$3 for the selected local minimum of signal S as the initial solution for method 300.

Note that controller 43 may search for the local minimum of signal S over the full retardance range of variable retarders 18, 20, and 22, which can exceed $2\pi$ for each of the retarders. Although in theory retardance values differing by integer multiples of $2\pi$ correspond to degenerate solutions (i.e., solutions that produce the same minimum value of signal S with phase difference $\Delta\Psi=\Delta\Psi_0$), the actual minimum value of signal S achieved may be limited by other factors. These factors include voltage-dependent polarization-dependent loss for voltage-controlled variable retarders, which in turn cause polarization mixing. Thus, it is desirable to search for all the local minimums of signal S over the full range of retardance values exceeding $2\pi$ and its multiples to obtain the best local minimum of signal S with the desired phase difference $\Delta\Psi_0$.

Figure 5:
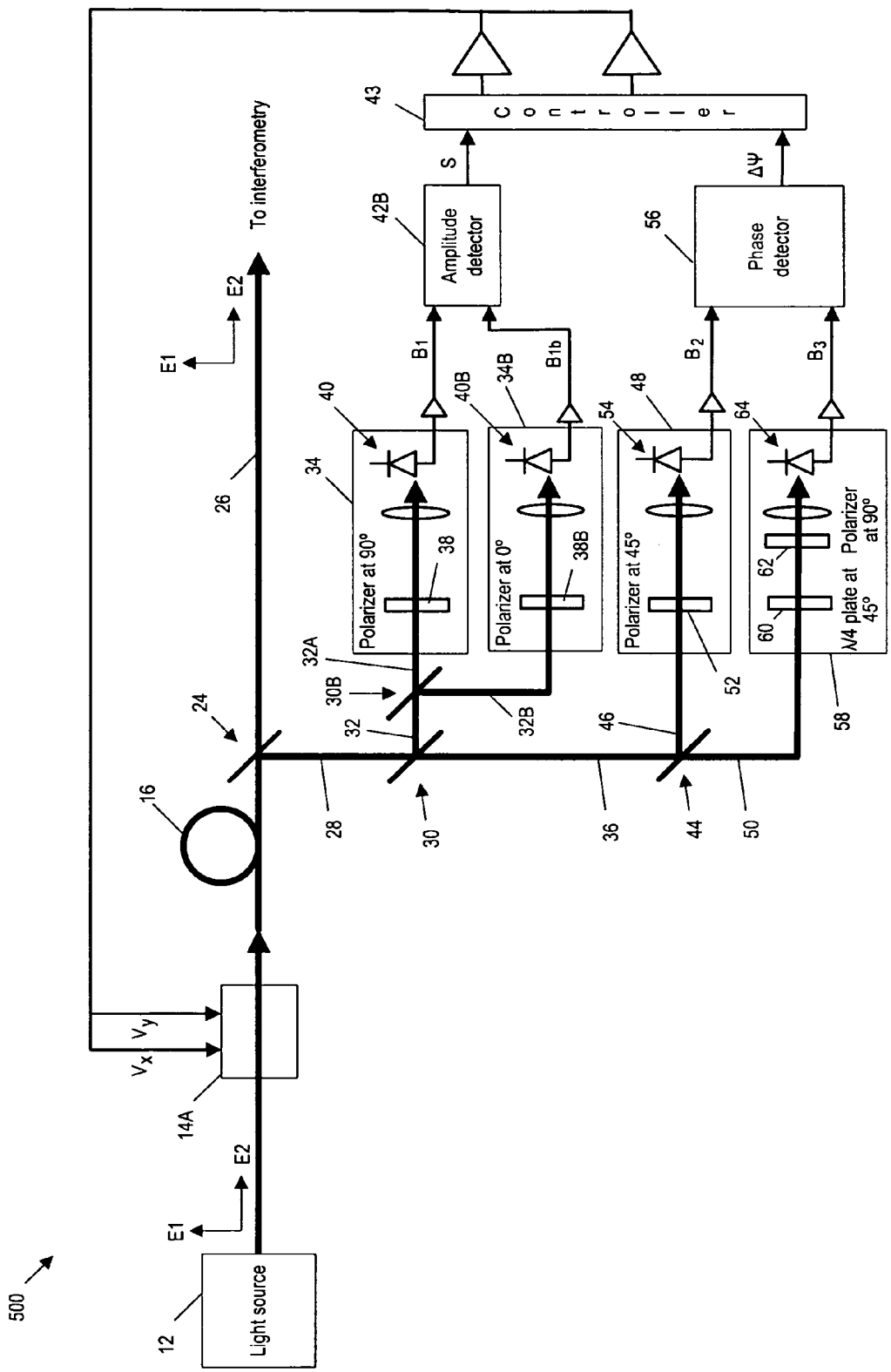
FIG. 5 illustrates a polarization control system for maintaining the polarization states of two nearly orthogonal linearly polarized light beams in one embodiment of the present teachings.

FIG. 5 illustrates one implementation of system 200 in FIG. 2, hereafter system 500, which is applicable to a specific orientation of the polarization states in one embodiment according to the present teachings. In system 500, light source 12 generates a substantially vertically linearly polarized (VLP) E1 and a substantially horizontally linearly polarized (HLP) E2. In system 500, it is desired to maintain the polarization states of E1 and E2 at the output of fiber 16. Thus, polarizer 38 is oriented at 90°, polarizer 38B is oriented orthogonal to polarizer 38 at 0°, polarizer 52 is oriented at 45°, wave plate 60 is selected to be a quarter-wave plate oriented at 45°, and polarizer 62 is oriented at 90°. Alternatively polarizer 38 is oriented at 180° and polarizer 38B is oriented orthogonal to polarizer 38 at 90°. An optional quarter-wave plate may be included in path 26.

Figure 6:
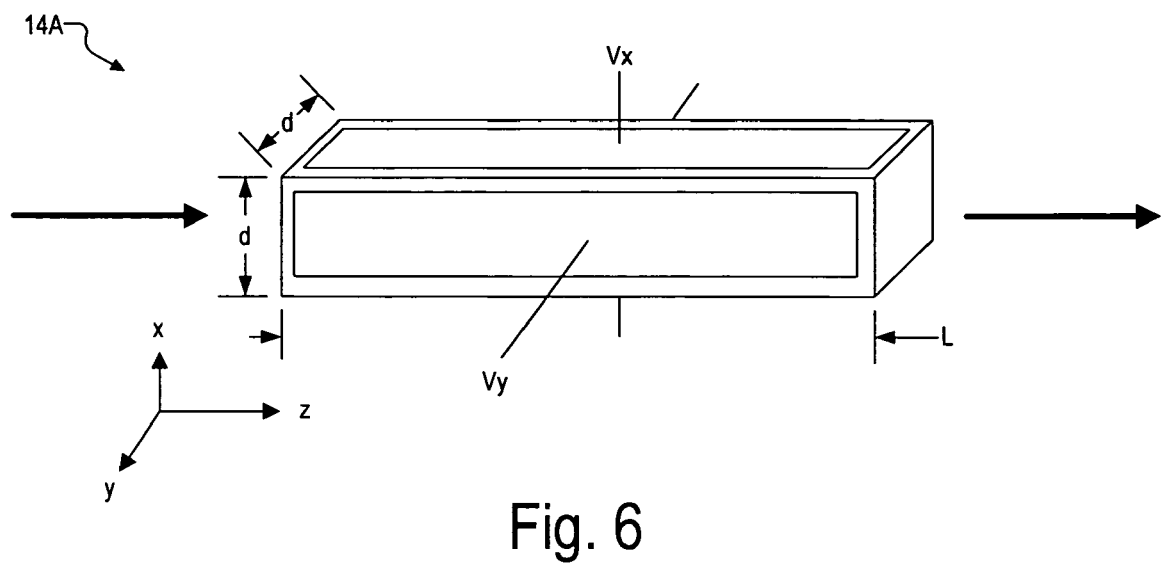
FIG. 6 illustrates a polarization state modulator in the polarization control system of FIG. 5.

FIG. 6 illustrates one embodiment of a PSM 14A used to adjust the polarization states of E1 and E2 in system 500

(FIG. 5). PSM 14A is a rotatable variable retarder made of an electro-optic crystal, such as lithium niobate crystal (LiNbO$_3$), with light propagation in the z-direction and voltages applied in the x and y-directions. The polarization axes and retardance of the LiNbO3 are controlled by changing voltages V$_x$ and V$_y$, so that any input polarization state can be transformed into any output polarization state if both V$_x$ and V$_y$ operate over a range [−V$_\pi$, V$_\pi$], where the half-wave voltage V$_\pi$=λd/(2n$_o^3$r$_{22}$L), λ is the wavelength of the light beam, d is the width and height of the LiNbO$_3$, n$_0$ is the ordinary index of the LiNbO$_3$, and r$_{22}$ is the electro-optical coefficient of the LiNbO$_3$.

In one embodiment, system 500 can use a method similar to method 300 (FIGS. 3 and 4) to maintain the desired polarization states of E1 and E2. Controller 43 first performs a global search to find initial values of voltages V$_x$ and V$_y$ that produce a local minimum of signal S and the desired phase difference ΔΨ$_0$. Controller 43 then performs a minimum search continuously to lock onto the minimum corresponding to the desired phase difference ΔΨ$_0$.

When a PM fiber is used in the systems described above, E1 and E2 typically undergo a small polarization change (e.g., less than 20% power change through the polarizer). Thus, there may not be a need for a PSM that can generate all the possible input polarization states in order to find and lock to the desired output polarization states. In fact, a proper design can reduce the range of polarization states that needs to be searched or used for locking, thereby allowing the elimination of one variable retarder and possibly the quadrature detection. For example, only polarization states covering half of the Poincare sphere (a mathematical construction which describes all polarization states) may need to be searched.

Figure 7:
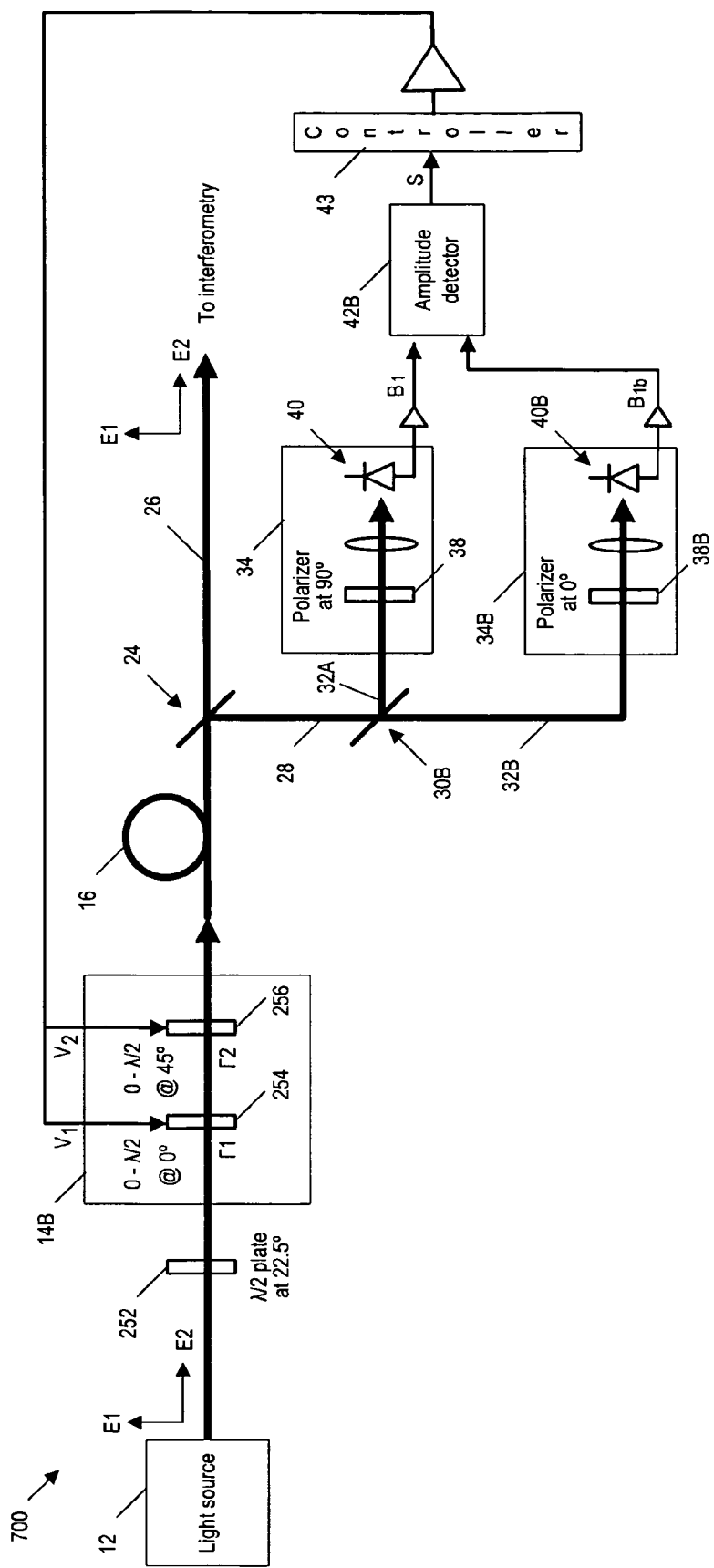
FIGS. 7, 8, 9, 10 illustrate polarization control systems for maintaining the polarization states of two nearly orthogonal linearly polarized light beams in embodiments of the present teachings.

FIG. 7 illustrates one implementation of system 200 in FIG. 2, hereafter system 700, which is applicable to small changes in the polarization states in one embodiment of the present teachings. In system 700, light source 12 generates a VLP E1 and a HLP E2. In system 700, it is desired to maintain the polarization states of E1 and E2 at the output of fiber 16.

A retarder 252 and a PSM 14B are used to produce a subset of the possible polarization states of E1 and E2. Retarder 252 is a half-wave plate oriented at 22.5°. PSM 14B includes (1) a variable retarder 254 oriented at 0° and having a variable retardance that ranges from 0 to λ/2, and (2) a variable retarder 256 oriented at 45° and having a variable retardance that ranges from 0 to λ2. Retarder 252 and PSM 14B allow approximately half of the Poincare sphere to be searched so system 10B will lock onto the only one local minimum of signal S that is accessbile, since the other solutions are excluded by design. Furthermore, retarder 252 and PSM 14B allow polarization states to be scanned continuously without any breaks within the region of interest (e.g., half the Poincare sphere) that would otherwise require one or more additional variable retarders to provide endless (i.e., reset-free) polarization control.

System 700 includes only the first detector path 34 and the fourth detector path 34B. Beam splitter 30B divides beams E1 and E2 from path 28 into paths 32A for the first detector path 34 and paths 32B for the fourth detector path 34B. Controller 43 uses beat signals B1 and B1$b$ to lock onto the only local minimum within the input polarization states that can be produced by PSM 14B. No global search for an initial solution is needed as only one local minimum is accessible within the input polarization states that can be produced by retarder plate 252 and PSM 14B.

Figure 8:
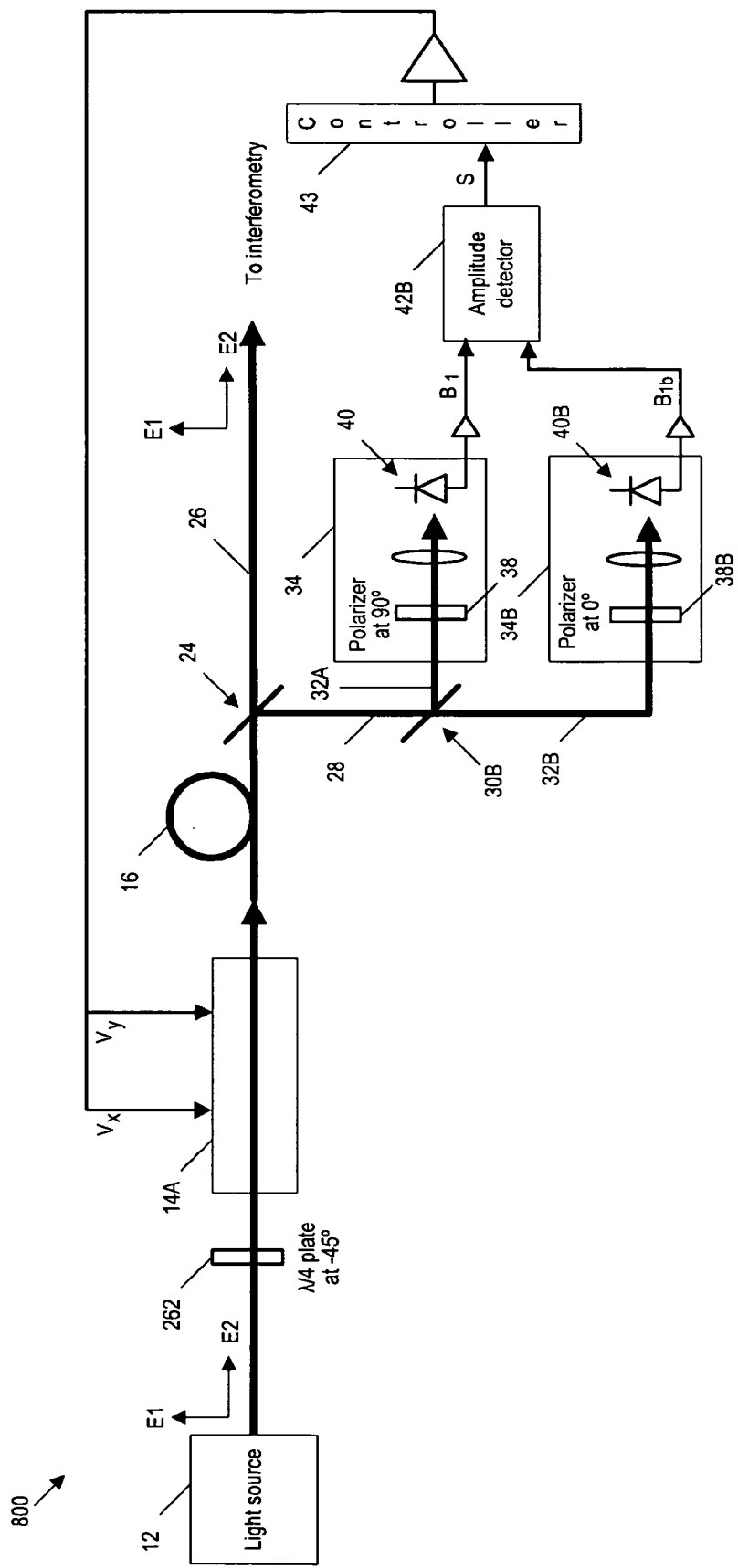

FIG. 8 illustrates a system 800 similar to system 700 (FIG. 7) except for a different retarder and a different PSM in one embodiment of the present teachings. System 800 includes a quarter-wave plate 262 oriented at −45° and PSM 14A (FIG. 6). As described above, PSM 14A is a rotatable variable retarder (e.g., a lithium niobate crystal) controlled by voltages V$_x$ and V$_y$, wherein voltage V$_x$ operates over a range [0, V$_\pi$] and voltage V$_y$ operates over a range [−V$_\pi$, V$_\pi$]. Retarder 262 and PSM 14A allow approximately half of the Poincare sphere to be searched continuously without any breaks in the polarization states that would otherwise require one or more additional rotatable variable retarders to provide endless polarization control.

Figure 9:
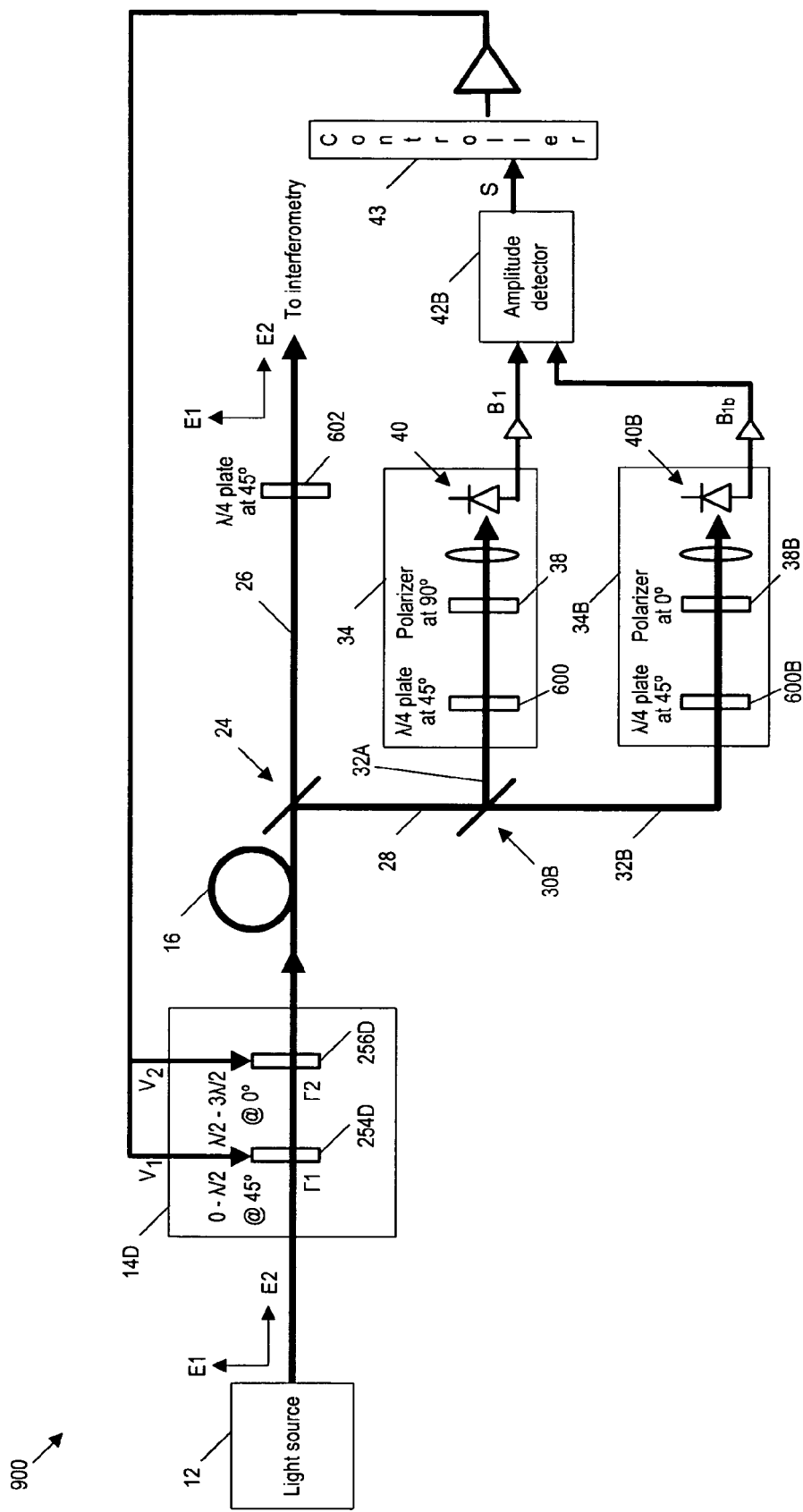

While the desired polarization states for heterodyne interferometry typically correspond to a VLP E1 and HLP E2, it is possible to design a system that locks E1 and E2 to polarization states other than VLP and HLP while still obtaining VLP and HLP states before E1 and E2 enter the interferometer. FIG. 9 illustrates such a system 900 in one embodiment according to the present teachings.

System 900 is similar to systems 700 and 800 except for modifications described below. The input polarization states are a VLP E1 and a HLP E2. Retarder 252 (FIG. 7) and retarder 262 (FIG. 8) are not used in system 700. PSM 14D includes (1) a variable retarder 254D oriented at 45° and operating over a retardance range of 0 to λ/2, and (2) a variable retarder 256D oriented at 0° and operating over a retardance range of λ/2 to 3λ/2. A quarter-wave plate 600 oriented at 45° is included in detector path 34 before polarizer 38 so that the minimum beat amplitude corresponds to a substantially left circular polarization (LCP) state E1 and a substantially right circular polarization (RCP) state E2. Similarly, a quarter-wave plate 600B oriented at 45° is included in detector path 34B before polarizer 38B so that the minimum beat amplitude corresponds to a LCP state E1 and a RCP state E2. A second quarter-wave plate 602 oriented at 45° is included in path 26 to convert the LCP E1 and RCP E2 to a VLP E1 and a HLP E2 before they enter the interferometer.

Figure 10:
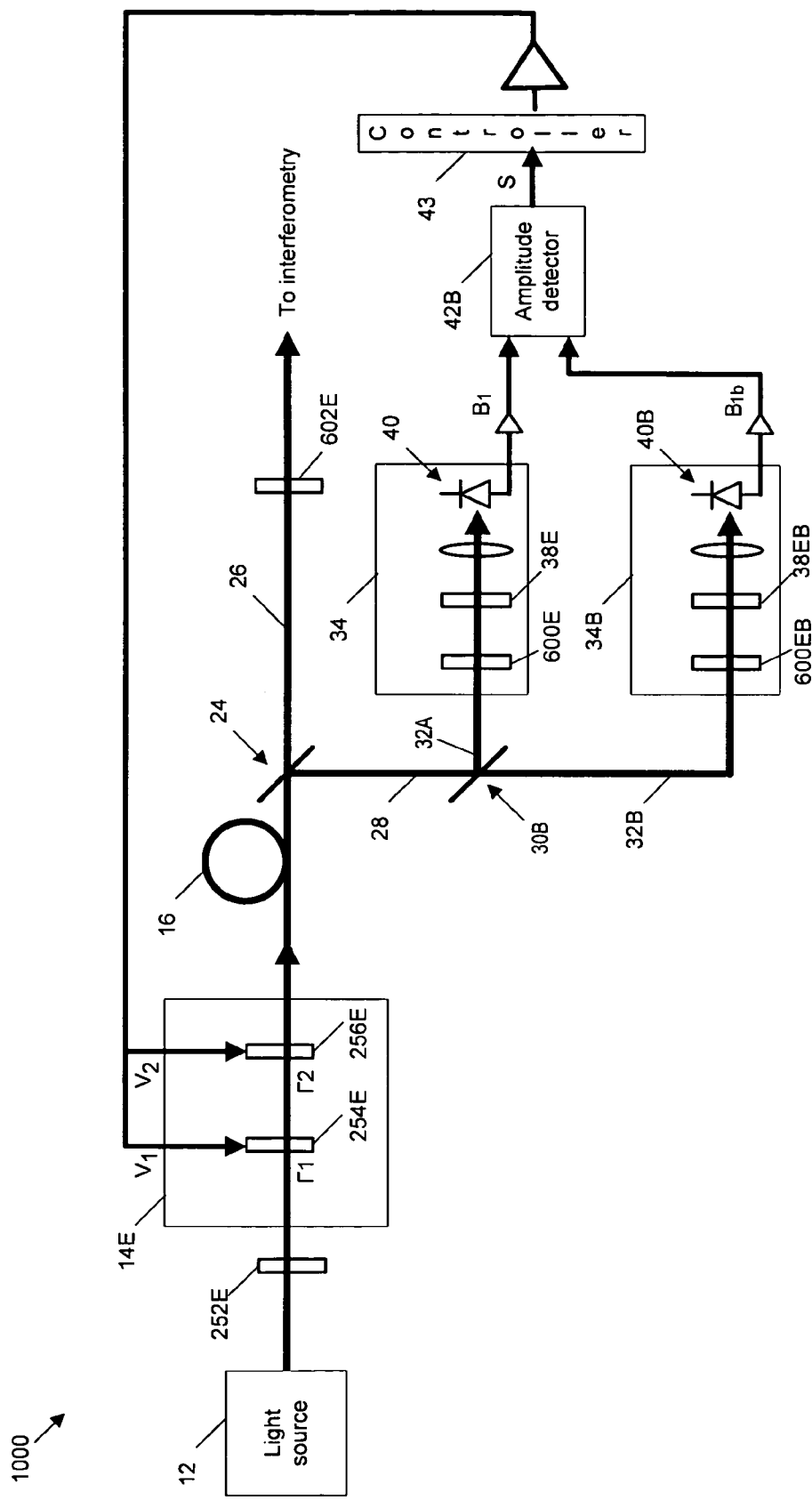

FIG. 10 illustrates a system 1000, which combines the features of system 700 and system 900, in one embodiment of the present teachings. In system 1000, light source 12 generates a E1 and a E2 with polarization states depending on the application. Similar to system 700, a retarder 252E and a PSM 14E are used to produce a subset of the possible polarization states of E1 and E2. The retardance and orientation of retarder 252E depend on the input polarization states and the desired output polarization states of E1 and E2. Similar to system 900, a retarder 600E is included in detector path 34 before polarizer 38 and a retarder 600EB is included in detector path 34B before polarizer 38B. This setup ensures that the minimum value of signal S corresponds to the desired polarization states of E1 and E2. A retarder 602E is included in path 26 to convert E1 and E2 to the desired polarization states before they enter the interferometer. Again, the retardance and the orientation of retarder 602E depend on the desired polarization states of E1 and E2.

Figure 11:
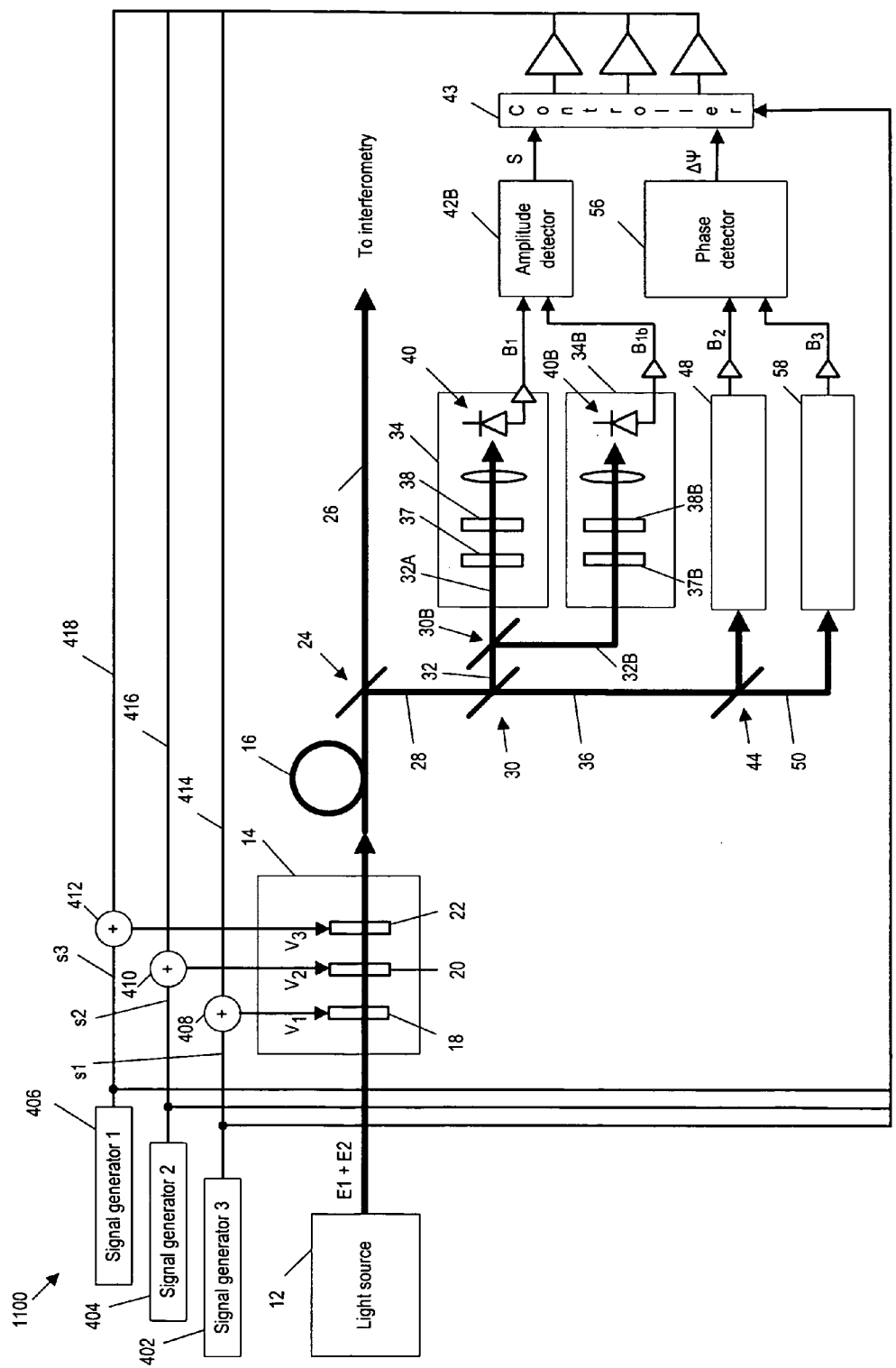
FIG. 11 illustrates a polarization control system using dithering to maintain any polarized states of two orthogonal light beams in one embodiment of the present teachings.

FIG. 11 illustrates one implementation of system 200 in FIG. 2, hereafter system 1100, which locks onto the minimum value of signal S using dithering. The technique of dithering generates small modulation terms to each control signal in order to aid the detection of the derivative of the detected signal (including sign). This technique also filters out changes in amplitude detected by amplitude-sensing device 42B due to other factors such as mechanical vibration and temperature variation. System 1100 is similar to system 200 except with the addition of signal generators 402, 404, and 406, and adders 408, 410, and 412. Signal generators 402, 404, and 406 generate small orthogonal modulation signals s1, s2, s3 (which could be sinusoidal at frequencies f1, f2, and f3). Controller 43 detects signals s1, s2, s3 and generates three signals 414, 416, and 418 using correlation techniques, which are added to corresponding control dither signals s1, s2, and s3 to generate control signals V1, V2, and V3 to variable retarders 18, 20, and 22, respectively.

Figure 12:
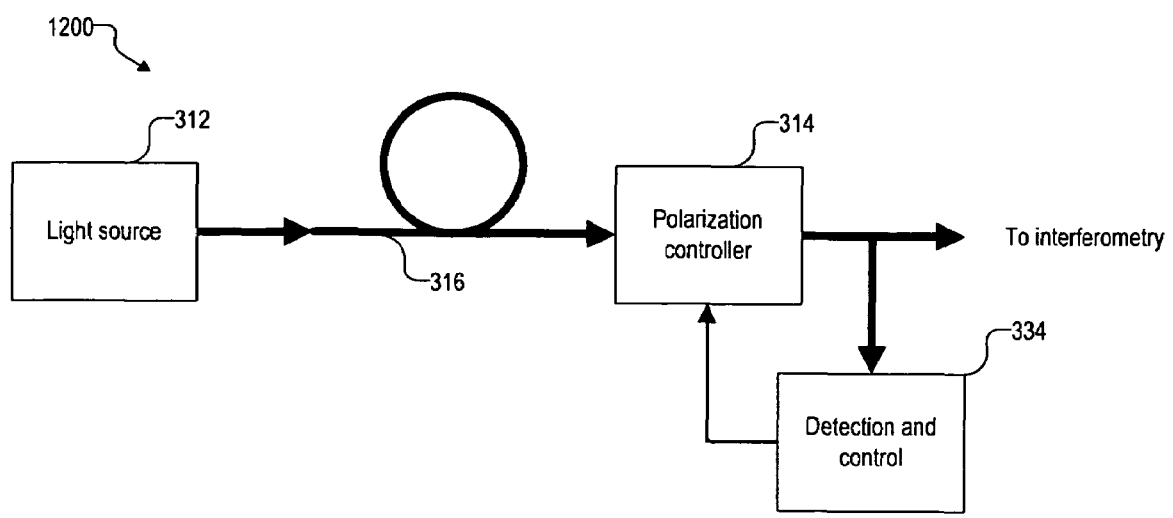
FIG. 12 illustrates a non-remote configuration of a polarization control system in one embodiment of the present teachings.

The various embodiments of the polarization control system described above have all been shown in a remote operation configuration, where the PSM is located upstream from the fiber and the measurement site. FIG. 12 illustrates one embodiment of a non-remote polarization control system 1200 where a PSM 314 is located downstream from a fiber 316 at the measurement site. As can be seen, a light source 312 launches two light beams with orthogonal polarization states and different frequencies into fiber 316. Fiber 316 then carries the two light beams to PSM 314. PSM 314 adjusts the polarization states of the two light beams before sending them to an output path and a monitor path. PSM 314 can be implemented as described above. The output path leads to an interferometry system for measuring displacement. The monitor path leads to a detection and control block 334 that generates the feedback control to PSM 314 to maintain the desired output polarization states of the two light beams. Block 334 can be implemented as described above.

Various other adaptations and combinations of features of the embodiments disclosed are within the scope of the present teachings. Note also that the desired output polarization states do not need to be the same as the input polarization states emerging from the light source. For example, one embodiment of system 700 in FIG. 7 can be used for input polarization states corresponding to a substantially left circularly polarized E1 and a substantially right circularly polarized E2 from the laser, and for generating desired output polarization states corresponding to a VLP E1 and a HLP E2. In such an embodiment, retarder 252 would be a quarter-wave plate oriented at 90°. Similarly, one embodiment of system 800 in FIG. 8 can be used for input polarization states corresponding to a substantially left circularly polarized E1 and a substantially right circularly polarized E2 from the laser, and for generating desired output polarization states corresponding to a VLP E1 and a HLP E2. In such an embodiment, retarder 262 may not be needed.

Although various embodiments of the PSM have been described above, additional embodiments of the PSM are useful and contemplated. One embodiment of the PSM includes two or more fiber squeezers whose birefringence properties are varied by the application of mechanical stresses. Mechanical stresses are applied to the fiber squeezers in response to the control signals from controller 43. Another embodiment of the PSM has two or more liquid crystal cells whose retardances and/or polarization axes are varied in response to the control signals from controller 43. Yet another embodiment of the PSM has two or more mechanically rotatable wave plates with fixed retardance. The wave plates are rotated in response to the control signals from controller 43. Yet another embodiment of the PSM has two or more photoelastic modulators whose linear birefringences are induced by the application of mechanical stresses. Mechanical stresses are applied to these photoelastic modulators in response to the control signals from controller 43. These and other embodiments described or contemplated are encompassed by the following claims.

What is claimed is:

1. A polarization control system for heterodyne interferometry, comprising:
   a light source generating a first light beam with a first polarization state and a first frequency, and a second light beam with a second polarization state and a second frequency;
   a polarization state modulator (PSM) receiving the first and the second light beams from the light source, the PSM having at least two degrees of polarization control, the PSM changing the first and the second polarization states;
   a first beam splitter splitting the first and second light beams into a first path and a second path;
   a first detector path receiving the first and the second light beams from the first path, the first detector path generating a first beat signal in response to the first and the second light beams;
   a second detector path receiving the first and the second light beams from the second path, the second detector path generating a second beat signal in response to the first and the second light beams;
   an amplitude detector receiving the first and second beat signals, the amplitude detector generating an amplitude signal derived from the first and second beat signals; and
   a controller receiving the amplitude signal, the controller generating a plurality of control signals for controlling the at least two degrees of polarization control in response to the amplitude signal.

2. A polarization control system for heterodyne interferometry, comprising:
   a light source generating a first light beam with a first polarization state and a first frequency, and a second light beam with a second polarization state and a second frequency;
   a polarization state modulator (PSM) receiving the first and the second light beams from the light source, the PSM having at least two degrees of polarization control, the PSM changing the first and the second polarization states;
   a first beam splitter splitting the first and second light beams into a first path and a second path;
   a first detector path receiving the first and the second light beams from the first path, the first detector path generating a first beat signal in response to the first and the second light beams;
   a second detector path receiving the first and the second light beams from the second path, the second detector path generating a second beat signal in response to the first and the second light beams;
   an amplitude detector receiving the first and second beat signals, the amplitude detector generating an amplitude signal derived from the first and second beat signals; and
   a controller receiving the amplitude signal, the controller generating a plurality of control signals for controlling the at least two degrees of polarization control in response to the amplitude signal;
   wherein the amplitude signal comprises a weighted mean-squared signal derived from amplitudes of the first and second beat signals.

3. The system of claim 1, further comprising a polarization-maintaining fiber receiving the first and the second light beams from the PSM and carrying the first and the second light beams to a site where interferometry measurements are taken and where the first beam splitter, the first detector path, the second detector path, and the amplitude detector are located.

4. The system of claim 1, wherein:
the first detector path comprises a first polarizer and a first photo detector, the first photo detector generating the first beat signal in response to the first and the second light beams that pass through the first polarizer; and
the second detector path comprises a second polarizer and a second photo detector, the second photodetector detector generating the second beat signal in response to the first and the second light beams that pass through the second polarizer.

5. The system of claim 4, wherein the first and the second polarizers are oriented substantially orthogonal to each other.

6. The system of claim 4, further comprising a half-wave plate oriented at substantially 22.5° between the light source and the PSM, wherein:
the PSM comprises a first variable retarder oriented at substantially 0° and a second variable retarder oriented at substantially 45°; and
the first polarizer is oriented at substantially 90° or 180°.

7. The system of claim 4, further comprising a quarter-wave plate oriented at -45° between the light source and the PSM, wherein:
the PSM comprises an electro-optic crystal receiving a first voltage in the x-axis and a second voltage in the y-axis; and
the first polarizer is oriented at substantially 90° or 180°.

8. The system of claim 4, wherein:
the PSM comprises a first variable retarder and a second variable retarder, the first variable retarder being oriented at substantially 45°, the second variable retarder being oriented at substantially 0°;
the first detector path further comprises a first retarder upstream from the first polarizer, the first retarder being a quarter-wave plate oriented at substantially 45°; and
the second detector path further comprises a second retarder upstream from the second polarizer, the second retarder being another quarter-wave plate oriented at substantially 45°.

9. The system of claim 4, further comprising a first retarder between the light source and the PSM, wherein:
the PSM comprises a first variable retarder and a second variable retarder;
the first detector path further comprises a second retarder upstream from the first polarizer; and
the second detector path further comprises a third retarder upstream from the second polarizer.

10. The system of claim 4, further comprising at least one retarder located upstream from the first polarizer in the first detector path, upstream from the second polarizer in the second detector path, between the light source and the PSM, or after the first beam splitter in an output path.

11. The system of claim 4, further comprising:
a second beam splitter splitting the first and the second light beams from the PSM into a third path and a fourth path, the third path carrying the first and the second light beams to the first beam splitter;
a third beam splitter splitting the first and the second light beams from the fourth path into a fifth path and a sixth path;
a third detector path receiving the first and the second light beams from the fifth path, the third detector path comprising a third polarizer and a third photo detector, the third photodetector detector generating a third beat signal in response to the first and the second light beams that pass through the third polarizer;
a fourth detector path receiving the first and the second light beams from the sixth path, the fourth detector path comprising a retarder, a fourth polarizer, and a fourth photo detector, the fourth photo detector generating a fourth beat signal in response to the first and the second light beams that pass through the retarder and the fourth polarizer;
a phase detector receiving the third and the fourth beat signals, the phase detector generating a phase signal in response to the third and the fourth beat signals; and
wherein the controller receives the phase signal and further generates the plurality of control signals in response to the phase signal.

12. The system of claim 4, wherein the PSM is selected from the group consisting of:
at least one liquid crystal cell, wherein at least one of (1) a retardance and (2) polarization axes of the liquid crystal cell vary in response to the plurality of control signals;
at least one fiber squeezer whose birefringence properties vary in response to mechanical stresses applied in response to the plurality of control signals;
at least one electro-optic crystal, wherein at least one of (1) a retardance and (2) polarization axes of the electro-optic crystal vary in response to the plurality of control signals;
at least one mechanically rotatable wave plates with fixed retardances whose polarization axes are rotated in response to the plurality of control signals; and
at least one photoelastic modulators whose linear birefringence properties are induced by mechanical stresses applied in response to the plurality of control signals.

13. The system of claim 4, wherein:
in a remote configuration, the system further comprises a fiber receiving the first and the second light beams from the PSM, the fiber carrying the first and the second light beams to a site where interferometer measurements are taken:
in a non-remote configuration, the system further comprises the fiber receiving the first and the second light beams from the light source, the fiber carrying the first and the second light beams to the PSM at the site where interferometer measurements are taken.

14. A method for maintaining polarization states of light beams from a fiber in a heterodyne interferometry system, comprising:
generating a first light beam and a second light beam, the first light beam having a first polarization state and a first frequency, the second light beam having a second polarization state and a second frequency;
adjusting at least two degrees of polarization control to change the first and the second polarization state;
splitting the first and the second light beams into a first path and a second path;
generating a first beat signal in response to the first and the second light beams from the first path;
generating a second beat signal in response to the first and the second light beams from the second path;
generating an amplitude signal derived from the first and the second beat signals; and
generating a plurality of control signals for controlling the at least two degrees of polarization control in response to the amplitude signal.

15. The method of claim 14, wherein:
prior to said generating a first beat signal, passing the first and the second light beams from the first path through a first polarizer; and
prior to said generating a second beat signal, passing the first and the second light beams from the second path through a second polarizer.

16. The method of claim 15, wherein the first and the second polarizers are oriented substantially orthogonal to each other.

17. A method for maintaining polarization states of light beams from a fiber in a heterodyne interferometry system, comprising:
generating a first light beam and a second light beam, the first light beam having a first polarization state and a first frequency, the second light beam having a second polarization state and a second frequency;
adjusting at least two degrees of polarization control to change the first and the second polarization state;
splitting the first and the second light beams into a first path and a second path;
generating a first beat signal in response to the first and the second light beams from the first path;
generating a second beat signal in response to the first and the second light beams from the second path;
generating an amplitude signal derived from the first and the second beat signals; and
generating a plurality of control signals for controlling the at least two degrees of polarization control in response to the amplitude signal;
wherein the amplitude signal comprises a weighted mean-squared signal derived from the first and the second beat signals.

18. The method of claim 14, further comprising:
splitting the first and the second light beams into a third path and a fourth path;
passing the first and the second light beams from the third path through a third polarizer and generating a third beat signal in response to the first and the second light beams from the third path;
passing the first and the second light beams from the fourth path through a fourth polarizer and generating a fourth beat signal in response to the first and the second light beams from the fourth path; and
generating a phase difference signal derived from the third and the fourth beat signals;
wherein said generating the plurality of control signals is further in response to the phase difference signal.

19. A method for maintaining polarization states of light beams from a fiber in a heterodyne interferometry system, comprising;
generating a first light beam and a second light beam, the first light beam having a first polarization state and a first frequency, the second light beam having a second polarization state and a second frequency;
adjusting at least two degrees of polarization control to change the first and the second polarization state;
splitting the first and the second light beams into a first path and a second path;
generating a first beat signal in response to the first and the second light beams from the first path;
generating a second beat signal in response to the first and the second light beams from the second path;
generating an amplitude signal derived from the first and the second beat signals;
generating a plurality of control signals for controlling the at least two degrees of polarization control in response to the amplitude signal;
splitting the first and the second light beams into a third path and a fourth path;
passing the first and the second light beams from the third path through a third polarizer and generating a third beat signal in response to the first and the second light beams from the third path;
passing the first and the second light beams from the fourth path through a fourth polarizer and generating a fourth beat signal in response to the first and the second light beams from the fourth path; and
generating a phase difference signal derived from the third and the fourth beat signals;
wherein said generating the plurality of control signals is further in response to the phase difference signal; and
wherein said generating the plurality of control signals comprises selecting initial values of the control signals, said selecting initial values comprises:
selecting values of the control signals that generate an amplitude signal with a minimum value and a phase difference signal with a desired value.

20. The method of claim 19, wherein said generating the plurality of control signals further comprises varying the control signals to achieve the minimum value of the amplitude signal.

21. The method of claim 20, wherein the first and the second light beams are selected from the group consisting of a substantially vertical linearly polarized light and a substantially horizontally linearly polarized light, and a substantially left circularly polarized light and a substantially right circularly polarized light.

22. The method of claim 14, further comprises:
generating orthogonal modulation signals;
adding the orthogonal modulation signals and the plurality of control signals to generate a second plurality of control signals for adjusting the at least two degrees of polarization control; and
wherein said generating the plurality of control signals is further in response to the orthogonal modulation signals.

* * * * *

UNITED STATES PATENT AND TRADEMARK OFFICE
CERTIFICATE OF CORRECTION

PATENT NO. : 7,362,445 B2
APPLICATION NO. : 11/156103
DATED : April 22, 2008
INVENTOR(S) : Law et al.

It is certified that error appears in the above-identified patent and that said Letters Patent is hereby corrected as shown below:

In column 13, line 50, in Claim 19, delete "interferometrv" and insert -- interferometry --, therefor.

In column 13, line 54, in Claim 19, delete "freciuency," and insert -- frequency, --, therefor.

Signed and Sealed this

Twelfth Day of August, 2008

JON W. DUDAS
*Director of the United States Patent and Trademark Office*